UNITED STATES PATENT OFFICE.

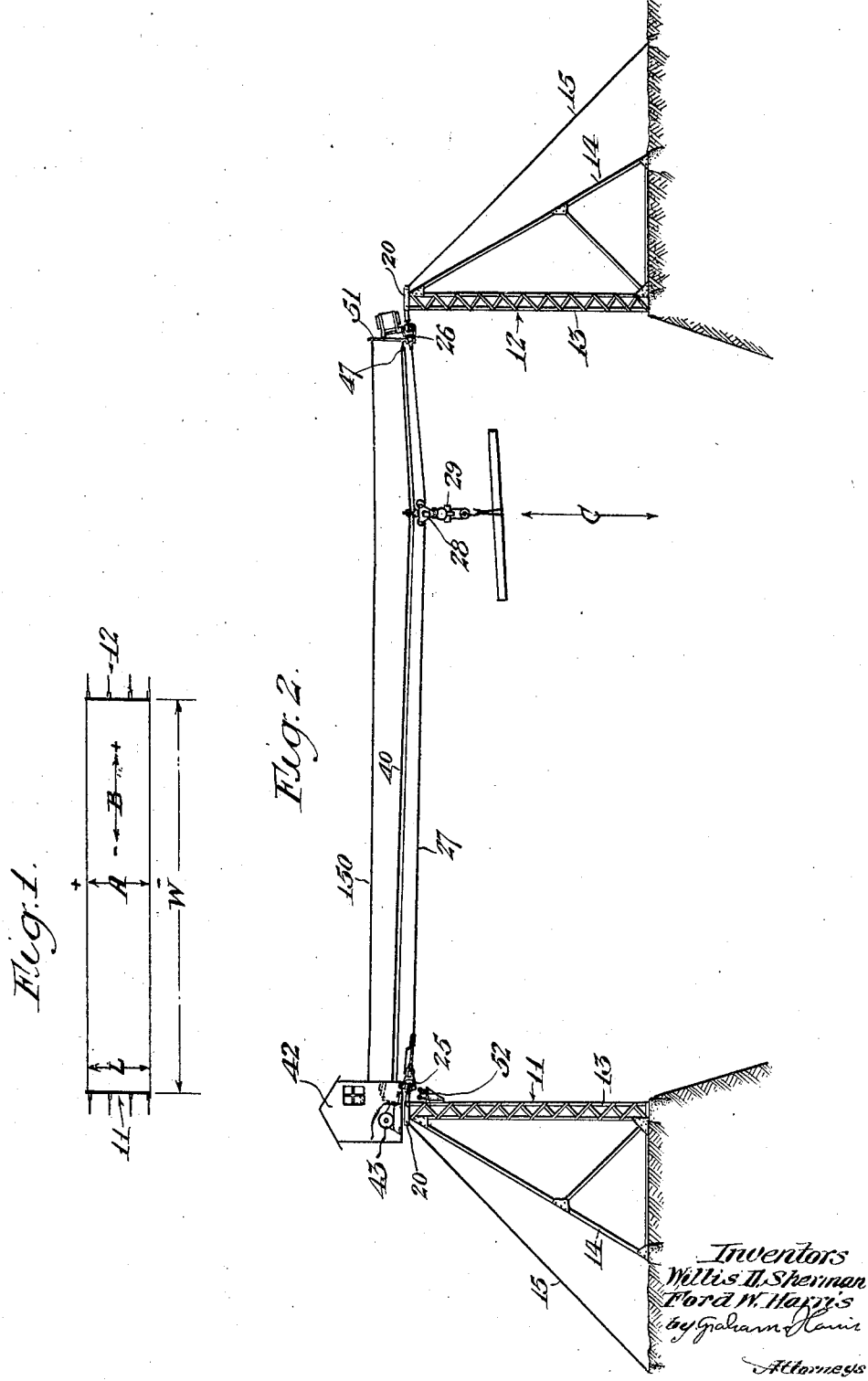

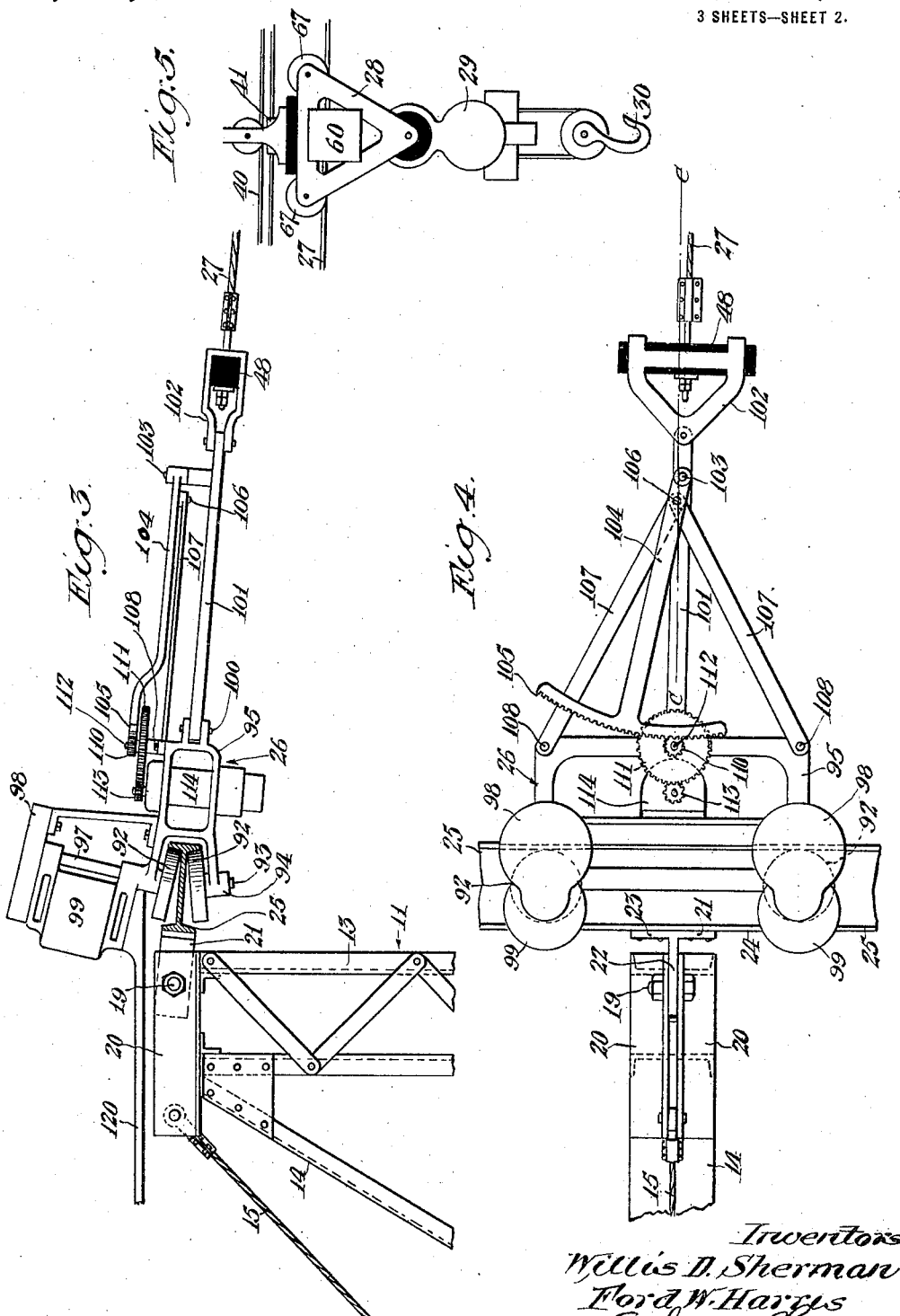

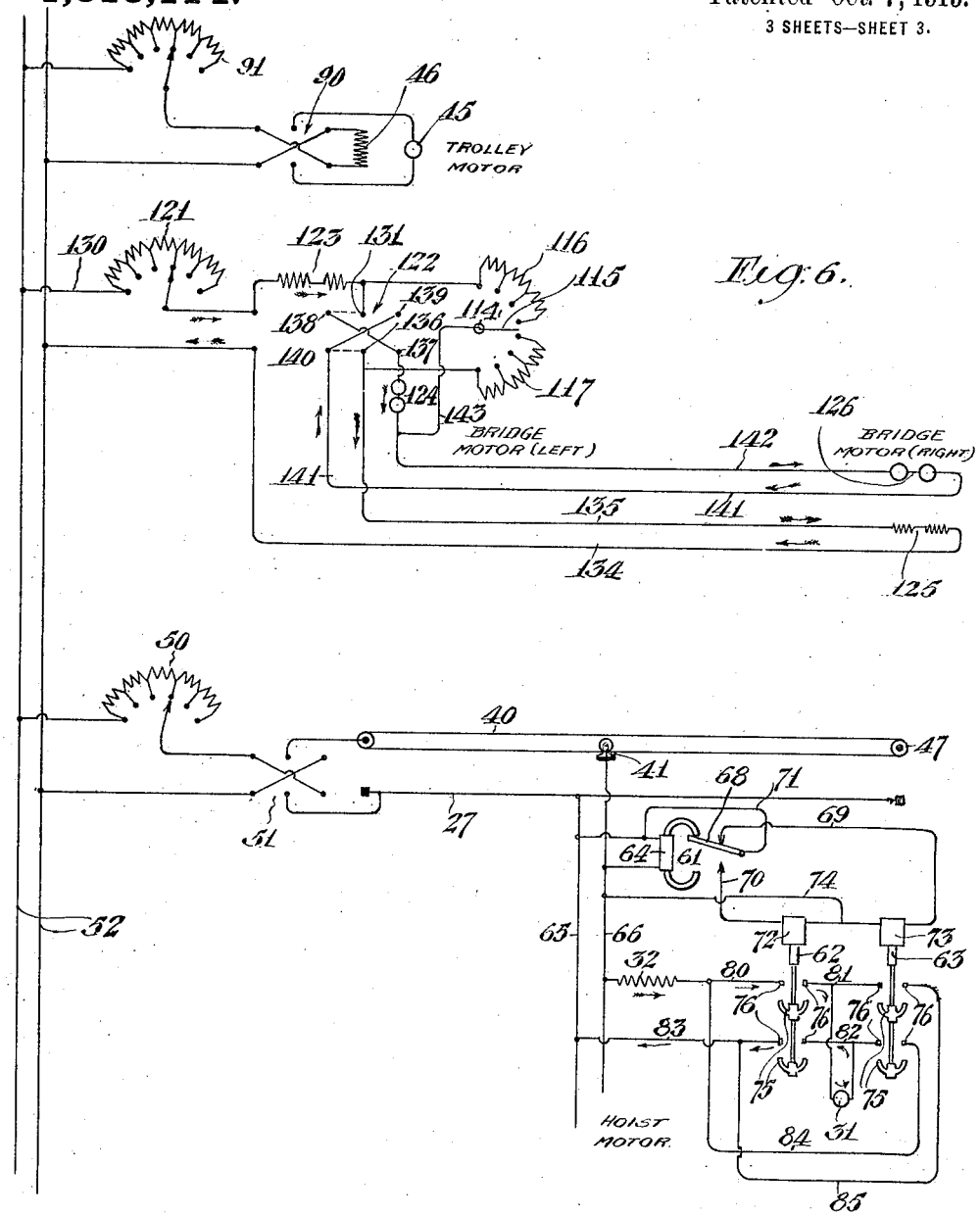

WILLIS D. SHERMAN AND FORD W. HARRIS, OF LOS ANGELES, CALIFORNIA; SAID HARRIS ASSIGNOR TO SAID SHERMAN.

AERIAL CARRIER.

1,318,114.     Specification of Letters Patent.     Patented Oct. 7, 1919.

Application filed September 3, 1918. Serial No. 252,480.

*To all whom it may concern:*

Be it known that we, WILLIS D. SHERMAN and FORD W. HARRIS, both citizens of the United States, residing at Los Angeles, in the county of Los Angeles and State of California, have invented a new and useful Aerial Carrier, of which the following is a specification.

Our invention relates to the art of moving material objects from place to place in a given area by means of a combined hoisting and transporting system, and the principal object of the invention is to provide a carrier which can hoist an object from any location within the area served by the carrier, transporting and lowering this object into any desired place within this area.

A further object of our invention is to provide an apparatus which will accomplish the above named object and which at the same time can be built, and erected at a much lower cost than any of the recognized forms of apparatus now used for the purpose.

A still further object of the invention is to provide an apparatus in which the parts are light and the frictional resistance is small so that the material to be handled can be handled with a minimum of power.

Our invention is particularly applicable for handling loads up to five tons over areas whose smallest dimension is two hundred feet or over.

Other objects and advantages will be made evident hereinafter.

Referring to the drawings, which are for illustrative purposes only,

Figure 1 is a diagrammatic plan view showing a typical area served by our invention.

Fig. 2 is a diagrammatic side elevation of our invention.

Fig. 3 is a side elevation, partly in section, on a larger scale than Fig. 2 of a portion of our invention.

Fig. 4 is a plan view of same.

Fig. 5 is a side elevation of the trolley and mechanism carried thereby, and

Fig. 6 is a diagram of the electrical connections.

As will be seen from the drawing shown in Fig. 2, our invention consists essentially of two structures 11 and 12 which may be made of wood or of structural steel as shown in the drawings. These structures consist essentially of columns 13 having suitable struts 14 and suitable guy wires 15 so that they will resist the forces which they are called upon to meet.

Secured on the top of each of the columns is a pair of angles 20. A T 21 is placed as shown in Figs. 3 and 4, the web 22 thereof passing between the angles 20 and the flange 23, being riveted to one of the flanges 24 of an I beam 25. One of these I beams 25 is provided for each of the structures 11 and 12 and is continuous throughout the length (L) of the area to be served.

For the purpose of distinguishing the terms length and breadth, preference should be had to the diagram, Fig. 1, which shows an area having a long dimension "W" and a short dimension "L". The dimension "W" represents the span between the structures 11 and 12, and for convenience it will hereinafter be referred to as the "width" of the area to be served, the dimension "L" being referred to as the "length" of the area to be served. In using the terms "right" and "left" reference should be had to Fig. 1.

The material which is to be handled must, of course, be raised and lowered in the direction of the arrow "C", which is double headed, the direction of travel being indicated by the plus and minus signs. After the material is raised it is transported in the direction "A", which is also plus and minus, or in the direction "B", which may also be plus and minus. The dimension "C" represents the hoisting travel of the material. The arrows "A" represent the carrier travel and the arrows "B" represent the trolley travel. The I beams 25 extend in the direction "L", and while this direction "L", as shown in Fig. 1, is less than the dimension "W", it may be of indefinite length.

Each of the T's 21 is pivoted between each pair of the angles 20 on a pin 19 so that the I beams 25 may adjust themselves to suit the direction of pull of the load to which they are subjected. Running on each of the I beams 25 is a carriage 26, and secured at either end to one of the carriages 26 and insulated therefrom, as will hereinafter be explained, is a main cable 27. Running on the main cable 27 is a trolley 28 and carried by the trolley 28 is a hoist 29. The entire apparatus is electrically driven, and the hoist 29 may be of any well known form, such, for example, as that shown on page 1121 of *Mark's Mechanical Engineer's Hand Book*, first edition, 1916. The function of the hoist 29 is to raise and lower a hook 30 by means of an electric motor, the armature 31 and field 32 of which are shown diagrammatically in Fig. 6. This motor may be of the series type and may be provided with an electric brake in accordance with standard practice. It is necessary that this motor be reversible so that the load can be raised and lowered in the direction "C" plus or "C" minus. The trolley 28 is moved back and forth on the main cable 27 by means of a trolley travel cable 40, the ends of this cable being secured to a stand 41 which is secured to but electrically insulated from the trolley 28, the cable 40 running back into a house 42 which is carried on one of the carriages 26 and in which a trolley travel drum 43 is placed.

This trolley travel drum consists of a drum or sheave around which the cable 40 passes, this drum or sheave being actuated through suitable gearing by means of a trolley motor whose armature 45 and field 46 are shown diagrammatically in Fig. 6. The trolley travel drum 43 may be of any convenient form, the details of which need not be illustrated in this application. The drum 43 is insulated from the surrounding structure and the cable 40 passes through a sheave 47 at the left hand end which is carried by and insulated from the left hand carriage 26 so that the trolley travel cable 40 is insulated at both ends and at its point of attachment to the trolley 28. The main cable 27 passes through an insulated block 48 at either end and is insulated thereby. The cables 27 and 40 are utilized as electrical conductors to supply electrical energy to the motor of the hoist 29.

The method of accomplishing this is shown in the diagram in Fig. 6, a rheostat 50 and reversing switch 51 being provided for the control of the hoist motor. This rheostat 50 and reversing switch 51 are carried in the house 42, the energy for operating them being delivered to the house 42 from trolley wires 52 carried on the column 11. The method of taking the electrical energy off the trolley wires 52 and delivering it to the interior of the moving house 42 is also standard practice in the hoisting art and the details thereof need not be illustrated herein. These trolley wires 52 are supplied with direct current of any convenient voltage, say 220 volts and the rheostat 50 and the reversing switch 51 shown diagrammatically in Fig. 6 may be conveniently embodied in a single controller with its accompanying resistors in accordance to standard practice in the art.

The cables 40 and 27 are connected to the trolley wires 52 in one relationship if the switch 51 is in one position and in another relationship if the switch 51 is thrown over into the reverse position. In other words, assuming a certain polarity on the trolley wires 52, the polarity of the energy supplied to the cables 27 and 40 can be reversed by means of the reversing switch 51 at the will of the operator.

Carried on the trolley 28 in a box 60 is a reverse current relay 61 and a pair of electrically operated contactors 62 and 63. The coil 64 of the reverse current relay 61 is connected directly to wires 65 and 66 which are in turn permanently connected to the cables 27 and 40 respectively, the wire 65 being connected to the framework of the trolley 28, the wheels 67 of which rest on and make contact with the cable 27, and the wire 66 being connected to the stand 41. The polarity of the coil 64, therefore, depends upon the polarity of the cables 40 and 27.

The moving portion of the relay 61 consists of a tongue 68 which is, in effect, a permanent magnet of fixed polarity, so arranged that this tongue moves in one direction if the coil 64 is energized in one direction and moves in the other direction if the polarity of the coil 64 is changed. This allows the tongue 68 to make contact with either a wire 69 or a wire 70, thus connecting one of these wires through a wire 71 with the wire 65. The wires 69 and 70 are each connected to one terminal of magnets 72 and 73 of the contactors 62 and 63, the other terminals of these magnets being connected through a wire 74 with the wire 66. The result of this arrangement is that with the coil 64 energized with one polarity, the magnet 72 is energized, and when energized with the opposite polarity the magnet 73 is energized. The contactors 62 and 63 each carry a pair of flexible brushes 75 and when either of the magnets is energized the brushes 75 are pulled upwardly making contact with stationary contacts 76.

The object of the contactors 62 and 63 is to change the relative relationship between the armature 31 and the field 32. With the contactor 62 in its raised position the current passes from the wire 66 through the field 32 and through a wire 80 through the contactor 62 to a common wire 81 to which one terminal of the armature 31 is connected. The other terminal of the armature is connected to a common wire 82 which is connected by means of the contactor 62 with a wire 83 which is in turn connected to the wire 65. Current therefore passes through the field 32 and through the armature 31 in a certain direction as indicated by the small arrows, the contactor 63 being out of action and all connections thereto being open.

If, on the other hand, the contactor 63 is energized, the contactor 62 being out of action the current passes through the field 32 and through a wire 84 through the contactor 63 to the wire 82, through the armature 31 in a direction opposite to the small arrow, to the wire 81 and from the wire 81 through the contactor 63 to a wire 85 and the wire 83 to the wire 65. When connected in this manner the relationship between the armature 31 and the field 32 is reversed.

The result of the operation of the members 65 to 85 above explained is that when the reversing switch 51 is in one position the armature 31 runs in one direction, and when the reversing switch is in the opposite direction, the armature runs in the opposite direction. In other words, the reversing switch 51 is utilized to control the direction of operation of the hoist 29 so that by operation of the switch 51 a load may be raised in the direction of "C" plus or "C" minus.

The load having been lifted from any spot within the area bounded by the dimensions "L"—"W", it is desired to move and lower this load into another position within this area. For the purpose of moving the load in the direction of "B" plus or "B" minus the drum 43 is energized in a positive or negative direction by means of a reversing switch 90, the speed of the motor being regulated by a rheostat 91 through the connections arranged as shown in Fig. 6. This diagram is elementary and the individual wires thereof need not be gone into herein.

In addition to moving the load in the directions "B" and "C" it is desired to move the load in the direction "A", and for this purpose it is necessary to move the entire carrier consisting of the carriages 26, the cable 27 and their associated parts in the direction "A". For this purpose motors are placed on the carriages 26, four motors being used. Each of the carriages 26 has four wheels 92, two of the wheels being below the I beam 25, each secured to shaft 93 which turns freely in a bearing 94 formed in a carriage frame 95. Both of the upper wheels 92 are rigidly secured to shafts 97 each of which is rotated by suitable gearing carried in a gear case 98 and driven by a motor 99.

Pivoted on a pin 100 in the carriage frame 95 is a tension bar 101, this tension bar being pivoted in turn to an insulator support 102 which carries the insulating block 48 which may well be formed of well dried wood impregnated with insulating compound. Rigidly secured to and projecting upwardly from the tension bar 101 is a fulcrum pin 103 on which a gear segment 104 is free to turn, this gear segment having gear teeth 105 on the rim thereof. Secured to the underside of the segment 104 is a pin 106 which is connected through bars 107 to pins 108 carried on the carriage frame 95. The teeth 105 mesh with a pinion 110 which is rigidly secured to a gear 111, the pinion 110 and the gear 111 turning freely on a shaft 112 fixed to the carriage frame 95. The gear 111 meshes with a pinion 113 which is connected to the drum of a controller 114. This controller is of standard type and is provided with a moving arm 115, shown diagrammatically in Fig. 6, which forms the moving member of two rheostats 116 and 117. A travel of the segment 104 on either side of the center line C—C of Fig. 4 results in the moving member 115 cutting in more or less of the resistance in the rheostats 116 and 117, as will hereinafter be explained. The parts 103 to 117 inclusive form the main cable equalizing gear.

One of these main cable equalizing gears is placed on the right hand carriage 26, being omitted from the left hand carriage. In other words, each of the main ropes 27 is provided with one of these equalizing gears which is below and adjacent to the house 42 which is supported on and travels with the left carriage 26, being mounted on the platform 120 thereof.

The method of operation of this equalizing gear will be better understood from an inspection of the diagram in Fig. 6. A rheostat 121 and a reversing switch 122 are employed, this rheostat and reversing switch being embodied in any convenient type of controller placed inside the house 42. The four motors 99 may be conveniently designated as the left hand and right hand motors. The left hand motors are carried on the left hand carriage 26 adjacent to the structure 11 and the right hand motors are carried on the carriage 26 adjacent to the structure 12. The fields of the left hand motors are numbered 123, the armatures being numbered 124, the fields of the right hand motors being numbered 125 and the armatures 126. It will be noted that the fields and armatures, as shown, are connected in pairs, each pair of motors operating as a unit, it being possible to substitute a single motor therefor, the two motors being used merely for the purpose of getting traction between the wheels 96 and the I beam 25.

The method of connection, as shown in Fig. 6, is as follows:

One of the trolley wires 52 is connected through a wire 130 with one terminal of the rheostat and through the left hand fields 123 with a center connection 131 of the reversing switch 122. Also connected to the center connections 131 is one terminal of the rheostat 116. The other trolley wire 52 is connected through a wire 134 with one terminal of the right hand fields 125, the other terminal of these fields being connected through a wire 135 with the other central connection 136 of the reversing switch 132. One terminal of the left hand armatures 124 is connected with the contacts 137 and 138 of the switch 122. The contacts 139 and 140 of this switch are connected through a wire 141 with one terminal of the left hand armatures 126, the other terminal of these armatures 126 being connected through a wire 142 with one terminal of the armatures 124. The wire 142 which connects the armatures 124 and 126 is connected through a wire 143 with the moving contact 115 of the rheostats 116 and 117. In practice the reversing switch 122 can be thrown over to connect the contact 131 with the contact 138 and the contact 136 with the contact 140.

With the connection so made, current will flow through the rheostat 121, the left hand fields 123, the switch contacts 131 and 138, the left hand armatures 124, the wire 142, the right hand armatures 126, the wire 141, the switch contacts 140 and 136, the wire 135 to the right hand fields 125, through the wire 134 and back to the trolley wire 52. This will place the fields 123 and 125 and the armatures 124 and 126 in a certain relation, the current passing in series through all the fields and all the armatures in the direction of the arrows.

By throwing the switch 122 in the opposite direction so that the contacts 131 and 139 and the contacts 136 and 137 are connected it will be seen that the direction of passage of current through the armatures 124 and 126 will be reversed, the direction of flow of current through the fields 123 and 125 being the same. Therefore, by a manipulation of the switch 122 the direction of rotation of all of the motors 99 may be reversed so that the switch 122 will control the direction of bridge travel in the direction "A" plus or "A" minus.

The function of the equalizing gear will now be explained. If the motors 99 are all connected in series, as indicated above, the load being moved in the direction "A" plus or "A" minus, it is evident that the load on all four of the wheels 96 will not always be constant, and it is further evident that in some cases there will be a liability to slippage in these different motors, and a further liability that some of the motors will run faster than the others so that one end of the rope 27 will have a tendency to move faster than the opposite end thus pulling the cable 27 out of a true right angled relationship to the I beams 25 and causing an increase in tension thereon with an accompanying jamming of the carrier. It is the function of the equalizing gear to so control these motors that the trailing motors will speed up and properly aline the cable 27. In other words, with the cable 27 moving in the direction "A" plus, as shown in Fig. 1, the function of the equalizing gear will be to so control the left hand motors 99 that they will be slowed down with relation to the right hand motors whenever the left hand motors get ahead of the right hand motors. This is accomplished by means of the rheostats 116 and 117. It will be seen that with the reversing switch 122 in its dotted position as shown in Fig. 6, the rheostat 116 is shunted around the left hand armatures 124 and the rheostat 117 is shunted around the right hand armatures 126. With the reversing switch in the opposite direction, the relationship between the rheostats 116 and 117 and the armatures 124 and 126 is reversed.

Let us suppose that the parts are so connected that the rheostat 116 is shunted around the armatures 124, or in its dotted position as shown in Fig. 6, and let us suppose that the armatures 124, which are on the left hand carriage, as viewed in Fig. 2, have driven their end of the cable 27 ahead in the direction "A" plus, this being the direction of travel of the cable 27. The equalizing gear is so arranged that the moving arm 117 starts to make contact with the armature 116 whenever this condition arises so that the rheostat 116 is thrown in shunt with the armatures 124 and a portion of the main current is thereby diverted from these armatures, decreasing their torque and reducing their speed. This reduction of speed and decrease in torque is increased the greater this advance on the left hand end of the rope 27 for the reason that the angularity of the link 101 to the I beam 25 is increased thereby throwing the segment 104 farther around and turning the shaft 113 farther around, thus cutting out more and more resistance in the rheostat 116. The parts 104 to 112 inclusive form an amplifying gear for causing a considerable movement in the rheostat 116 for a small change in angularity of the cable 27 with relation to the I beam 25. As the moving arm 115 moves farther around due to this increase in angularity, more and more resistance is cut out until finally all of the resistance is cut out thereby short circuiting the armatures 124 and diverting all current therefrom. As a result the armatures 126 continue to operate to correct the angularity of the rope 27, and as soon as this angularity is partially corrected, the arm 115 reverses its movement cutting in the resistance in the rheostat 116 and diverting some of the main current into the armatures 124. With the rope 27 exactly at right angles to the I beams 25 at either end, the rheostats 116 and 117 are out of action, the moving arm 115 being in its middle position and out of contact with the segments of both rheostats. In the event that the left hand motors 99 are unable to take their share of the load so that they lag behind, when moving for example in the direction "A" plus, the regulating gear functions in the opposite manner to that just explained and the rheostat 117 is utilized to shunt the armatures 126 and slow them down so that the armatures 124 can catch up. This correcting action may continue as previously explained until the armatures 126 are entirely short circuited.

The above explanation applies to one position of the reversing switch 122. If this reversing switch is thrown over it will be noted that not only is the direction of current flow through the armatures reversed without a reversal of the direction of current flow through the fields, but that in addition the relationship of the rheostats 116 and 117 to the armatures 124 and 126 is reversed. In other words, the rheostat 116, which in the above explanation has been considered as shunted across the armatures 124, is reversed so that this rheostat is now shunted across the armatures 126. As a result of the operation of the reversing switch, we find therefore that the main cable 27 tends to travel in the direction "A" minus, and we find further that the corrective action of the reversing gear is reversed so that when traveling in this direction a movement of the reversing gear into the position shown in Fig. 4 tends to slow down the armatures 126. In other words, the operation of the reversing gear is made such that it automatically corrects inequalities in angular position in the rope 27 in this direction.

The wires 134, 135, 141 and 142 may be conveniently grouped into a four conductor cable 150 which is secured to the house 42 on one end and which is secured to an insulating support 151 on the other, it being understood that the armature 126 and the field 125 controlled by this four conductor cable are located at right hand end of the carrier.

It will be seen that our invention includes certain novel features. In the first place it includes the conception of the trolley 29 which is carried on the cable 27 and the novel method of controlling the direction of rotation of this trolley by a reversal of the polarity on the cables 27 and 40. It consists further in the novel feature of using the cables 27 and 40 to feed the trolley motor, thus eliminating the necessity of external trolley wires which in a long span would be very likely to swing together and short circuit.

It further consists in the novel conception of the equalizing gear which tends to automatically correct any defect in angularity in the cable 27 with relation to the I beams 25 so that this cable, without attention from the operator and without regard to the position of the load, is always maintained at or near its proper right angle position with relation to the I beams 25.

It will be seen that by our invention it is possible to lift a load in the direction "C" plus by a suitable manipulation of the rheostat 50 and the reversing switch 51. It is then possible to move this load in the direction "B" plus or "B" minus by causing the trolley 29 to travel on the cable 27, this movement being controlled by the rheostat 91 and the reversing switch 90. It will further be evident that it is possible to move the carrier comprising the cable 27 and its supporting carriages 26 bodily along the I beams 25 and in proper right angle relationship therewith by means of a manipulation of the rheostat 121 and the reversing switch 122. It is further evident that by moving in the directions "B" plus and "B" minus and "A" plus and "A" minus that the load may be transported to any point within the area "L"—"W." It is further evident that by a suitable manipulation of the rheostat 50 and the reversing switch 51 that the load may then be lowered to its desired position within that area. It will further be evident that the span "W" may be made very long, spans of one thousand or fifteen hundred feet not being excessive. It is further evident that these long spans would be very difficult to handle with any sort of a rigid overhead bridge and that they are beyond the commercial field of such devices as bridge cranes and the like.

It is further evident that the structures 11 and 12 are short with relation to the area to be handled. For example, if we were to consider the dimension "L" as one hundred feet, it is evident that an overhead traveling crane could be made having a span of 100 feet and that this traveling crane could move bodily in the direction "B" plus or "B" minus and serve the entire area "L"—"W." This, however, would require structures equivalent to the structures 11 and 12 which would have the length "W" and which would therefore be very much more expensive than the short structures 11 and 12. It is further evident that with any sort of a rigid overhead structure that the dimension "L" must be one hundred feet or so unless the weight and size of this structure become prohibitive. It is therefore evident that the first cost of serving any area "L"—"W" will be smaller than the first cost of a rigid traveling crane, and it is further evident that whatever the area to be served, this cost will still be less providing the span "W" is large. It is therefore evident that in this field which comprises very large areas handling moderate loads that the type of carrier above described is far superior to any of the commercial forms of apparatus now in operation.

What we claim is:—

1. An aerial carrier comprising a pair of supporting structures; a pair of carriages each having wheels running on one of said structures; a main cable anchored at either end on one of said carriages; a trolley running on said main cable; a trolley travel cable anchored to said trolley; a trolley travel cable driving means carried on one of said carriages; an electrically driven hoist carried on said trolley hoist; control means for starting, controlling, stopping and reversing the action of said electrically driven hoist; and means for utilizing said main cable and said trolley travel cable as electrical conductors between said hoist and said control means.

2. In an aerial carrier, a main cable; a pair of carriages to each of which one end of said main cable is secured; a pair of stationary parallel structures on each of which one of said carriages in adapted to travel; an electrical motor on each of said carriages; a pair of resistors; a rheostat for connecting each of said resistors in shunt with the armature of one of said motors; and means actuated by the angular movement of said main cable for so actuating said rheostat.

3. In an aerial carrier, a main cable; a pair of carriages to each of which one end of said main cable is secured; a pair of stationary parallel structures on each of which one of said carriages is adapted to travel; an electrical motor on each of said carriages; a pair of resistors; a rheostate for connecting each of said resistors in shunt with the armature of one of said motors; and mechanism for so actuating said rheostat that one of said resistors is shunted around the armature of the motor on the carriage farthest advanced whenever one of said carriages advances ahead of the other.

4. In an aerial carriage, a main cable; a pair of carriages to each of which one end of said main cable is secured; stationary structure on which said carriages run; means for driving each carriage; and means for correcting any deviation in angularity from the proper right angled relationship of said main cable with either of said carriages.

5. In an aerial carrier, a main cable; a pair of carriages to each of which one end of said main cable is secured; stationary structure on which said carriages run; an electric motor on each of said carriages; and means by which any angular movement of said cable about its point of attachment to one of said carriages is utilized to control said motors and reverse and nullify said angular movement.

6. In an aerial carrier, a main cable; a pair of carriages to each of which one end of said main cable is secured; stationary structure on which said carriages run; an electric motor on each of said carriages; a controller for one of said motors; and gearing by which any angular movement of said main cable about its point of attachment to one of said carriages is transmitted to said controller for the purpose of reversing and nullifying said angular movement.

7. In an aerial carrier, a main cable; a pair of carriages to each of which one end of said main cable is secured; stationary structure on which said carriages run; an electric motor on each of said carriages; a controller for one of said motors; a segment pivoted at one point on a member secured to and coinciding with the axis of said cable and at another point on a pin rigidly held with relation to said carriage; and mechanism by which the relative movement of said points actuates said controller to vary the speed of the motor and compensate for and correct said movement.

8. In a device of the general character set forth, a structure, a carriage adapted to move on said structure, a load carrying member pivoted on said carriage, driving means for moving said carriage on said structure, and means by which said driving means is partially controlled by a change in the angular relationship between said member and said carriage.

9. In a device of the general character set forth, a structure, a wheeled carriage running on said structure, a load carrying member pivoted on said structure, an electric motor causing said carriage to run on said structure, a controller for said motor, and means whereby a change in the angular relationship between the carriage and the load carrying member actuates said controller.

In testimony whereof we have hereunto set our hands at Los Angeles, California, this 24th day of August, 1918.

WILLIS D. SHERMAN.
FORD W. HARRIS.

Copies of this patent may be obtained for five cents each, by addressing the "Commissioner of Patents, Washington, D. C."